United States Patent [19]

Goebel et al.

[11] Patent Number: 5,232,283

[45] Date of Patent: Aug. 3, 1993

[54] APPARATUS FOR MIXING CONCURRENTLY, DOWNWARDLY FLOWING FLUIDS

[75] Inventors: Kenneth W. Goebel; Vishnu A. Patel; Earl L. Whittington, Jr., all of Houston, Tex.

[73] Assignee: The M. W. Kellogg Company, Houston, Tex.

[21] Appl. No.: 959,871

[22] Filed: Oct. 13, 1992

[51] Int. Cl.⁵ .................. B01F 13/00; B01F 5/00; B01J 8/04

[52] U.S. Cl. .................... 366/336; 366/340; 261/113; 261/114.1; 422/225; 422/257

[58] Field of Search ........... 366/336, 337, 340, 341, 366/9; 261/113, 114.1, 114.2, 114.3; 422/225, 257

[56] References Cited

U.S. PATENT DOCUMENTS

| | | | |
|---|---|---|---|
| 2,486,200 | 10/1949 | O'Connor | 366/336 |
| 2,523,126 | 9/1950 | Long | 366/340 |
| 2,877,099 | 3/1959 | Bowles | 23/288 |
| 3,136,712 | 6/1964 | van Driesen | 208/58 |
| 3,218,249 | 11/1965 | Ballard et al. | 208/108 |
| 3,556,736 | 1/1971 | Boyd | 23/288 |
| 3,592,612 | 7/1971 | Ballard et al. | 23/288 |
| 3,598,541 | 8/1971 | Hennemuth et al. | 23/288 |
| 3,796,655 | 3/1974 | Armisted et al. | 208/216 |
| 3,958,952 | 5/1976 | van Ginneken | 23/288 |
| 4,550,000 | 10/1985 | Bentham | 261/114.1 |
| 5,098,615 | 3/1992 | Resetarits | 261/114.1 |
| 5,152,967 | 10/1992 | Rossetti | 366/336 |

FOREIGN PATENT DOCUMENTS

0955993  9/1982  U.S.S.R. ................. 366/336

Primary Examiner—Robert W. Jenkins
Attorney, Agent, or Firm—John P. Ward

[57] ABSTRACT

An apparatus and method for mixing concurrently downwardly flowing fluids is disclosed. The apparatus comprises a tray extending horizontally across a cross-section of a mixing chamber and having an aperture in the middle. A cap having a pair of opposing openings covers the aperture. Fluids pass through the openings into a pan adjacent a downstream portion of the mixing chamber and spaced below the tray. A tube encircling the aperture is disposed between the cap and the pan. The tube has notches cut into the lower wall to allow the fluids to enter the pan. Radially spaced risers extending from the bottom of the pan provide fluid communication to a downstream portion of the mixing chamber. The risers have upper ends which are above the notches and spaced below the tray. The mixing apparatus can be used between two catalyst beds in a vertical, fixed-bed reactor, wherein a hot, mixed-phase effluent stream is quenched with a hydrogen-rich gas in hydrodesulfurization, hydrocracking, and like processes.

20 Claims, 2 Drawing Sheets

APPARATUS FOR MIXING CONCURRENTLY, DOWNWARDLY FLOWING FLUIDS

FIELD OF THE INVENTION

The present invention relates to an apparatus for intimately mixing fluids flowing concurrently downwardly in a vessel.

BACKGROUND OF THE INVENTION

Catalytic processes for the treatment of hydrocarbons are well known, particularly hydrogenation treatments such as hydrodesulfurization, hydrotreating, hydrocracking, and the like in a fixed bed reactor. Such processes are multi-phase and require the mixing of gas and liquid streams. Catalytic hydrogenation reactions, for example, are generally exothermic in character, and temperature control of the reactor is an important feature. This is typically addressed in the art by using two or more vertically supported catalyst beds mounted in series in the reaction vessel with the mixed phase fluids flowing downwardly and discharged at the bottom of the vessel. Hydrogen gas is typically used as a quench between beds.

Mixing gases and liquids is a difficult task because the large density difference tends to a quick separation. Good mixing, however, is important to insure a relatively even temperature and/or component composition distribution in the mixture. Heavier and lighter components can channel through the catalyst bed or other vessel internals. In a quench zone, good mixing is also necessary to obtain an effective quench. Otherwise, an uneven temperature distribution in the reactant stream can result in temperature control problems, localized hot spots, and unwanted reaction products in the lower beds, and premature catalyst degradation.

The mixing problem in the quench zone is complicated by the occurrence, at least to some extent, of mixed-phase conditions within the previous catalyst bed and attendant channeling mentioned above. Furthermore, since the amount of quench gas used is relatively low compared to the large quantity of hot effluent fluids and the large cross-section area of the reactor vessel which must be covered, excellent mixing between the effluent fluids and quench gas is important if a sufficient degree of cooling and temperature uniformity is to be achieved.

The art of gas/liquid mixing design has typically been conceptually based on providing a holdup region for the liquid components and a means for sparging the gaseous components into the liquid holdup. In addition, mixers have generally functioned as distributors for enhancing reactant distribution over the cross-section of the reactor beds.

U.S. Pat. No. 3,592,612 to Ballard et al discloses a two-stage mixing device, comprising a horizontal tray adapted for installation in a downflow contacting vessel, a first stage mixing box mounted on an upper surface of the tray, a second stage mixing box attached to an under surface and at least two spaced apertures in the tray communicating the mixing boxes.

U.S. Pat. No. 3,598,541 to Hennemuth et al. discloses an apparatus for contacting two fluids in a fluid-solids contacting zone, wherein a first fluid (e.g. a gas) is passed into a central chamber having a plurality of fluid openings in the chamber wall while a second fluid (e.g. a liquid) is passed into an annular chamber encompassing the central chamber and spaced apart therefrom. The second fluid is discharged via fluid openings in the inner annular chamber wall, into an annular space between the chambers, and the first fluid is discharged from the central chamber into the second fluid discharge. A resulting fluid mixture is passed from the annular space into a bed of particulated contact solids.

U.S. Pat. No. 3,556,736 to Boyd discloses an apparatus for contacting two fluids in a fluid-solids contacting zone, wherein a first fluid (liquid) is passed downwardly into a distributor downcomer and a second fluid (gas) is passed upwardly into the downcomer via an inlet nozzle contained within the downcomer. A resulting mixture passes down through the annulus confined between the downcomer wall and the inlet nozzle and enters the particulated solids below.

U.S. Pat. No. 3,218,249 to Ballard et al. discloses a vapor-liquid feed distribution means in a hydrocarbon conversion process comprising a mounted horizontal tray having cap and downcomer means through which the vapor and liquid feed materials are distributed onto a bed of contact material. An improved means for contacting and distributing vapor-liquid mixed phases is said to be provided.

Additional U.S. patents which may be of interest include U.S. Pat. No. 3,958,952 to van Ginneken and U.S. Pat. No. 3,796,655 to Armstead et al.

SUMMARY OF THE INVENTION

The present invention involves the enhancement of concurrent mixing of multiphase fluids in downwardly flowing process streams by using a space efficient mixing apparatus to reduce temperature variation in the mixed stream. The mixing apparatus is particularly useful to improve temperature control of multi-bed catalytic reactors in exothermic processes such as hydrodesulfurization, hydrocracking, and the like wherein a hot, mixed-phase reactor effluent stream is quenched with a hydrogen-rich gas between beds. The mixing apparatus of the present invention can also be used in absorption processes.

In one embodiment, the present invention provides a mixing apparatus comprising a tray extending across a mixing chamber and having an aperture. A cap having a plurality of openings covers the aperture. A pan is disposed adjacent a downstream portion of the mixing chamber and spaced from the tray. A tube enclosing the aperture is disposed between the cap and the pan. The tube has a plurality of passages formed in a wall adjacent the pan through which fluid from the openings, aperture and tube can enter the pan. A plurality of risers extending from the pan provide fluid communication to a downstream portion of the mixing chamber. The risers have upper ends which preferably extend above the passages, but are spaced below the tray.

The present invention also provides a method for contacting first and second fluids. The method includes the steps of: (1) concurrently introducing the first and second fluids into a mixing chamber upstream from a tray extending across the mixing chamber, wherein the tray has a cap disposed on a top surface of the tray covering an aperture therethrough; (2) passing the combined fluids through radially spaced openings formed in side walls of the cap and through the aperture into a tube disposed between the tray and a pan spaced downstream from the tray; (3) passing the combined fluids from the tube through passages formed through a wall of the tube adjacent the pan; and (4) passing the fluids from the passages through risers on the pan into a downstream portion of the mixing chamber. Preferably, the first fluid is a gas and the second fluid is a liquid, and the method also includes the step of maintaining a liquid level on the pan into which the fluids are discharged from the passages. The present method is particularly well-suited for gas absorption in the mixing chamber wherein the gas contains one or more components soluble in the liquid. The absorption may include passing the gas/liquid through a plurality of the mixing chambers in series, as in an absorption column.

In another embodiment, the present invention provides a method for quenching a mixed phase stream with a gaseous quench stream. The method includes the steps of: (1) concurrently introducing the mixed phase stream and the gaseous quench stream into a mixing chamber upstream from a tray extending across the mixing chamber, wherein the tray has a cap disposed on a top surface of the tray covering an aperture therethrough; (2) passing the mixed streams through radially spaced openings formed in side walls of the cap and through the aperture into a tube disposed between the tray and a pan spaced downstream from the tray; (3) passing the mixed streams from the tube through passages formed through a wall of the tube adjacent the pan; (4) maintaining a liquid level on the pan onto which the streams are discharged from the passages; and (5) passing the fluid streams through risers on the pan into a downstream portion of the mixing chamber.

DETAILED DESCRIPTION OF THE INVENTION

Figure 1:
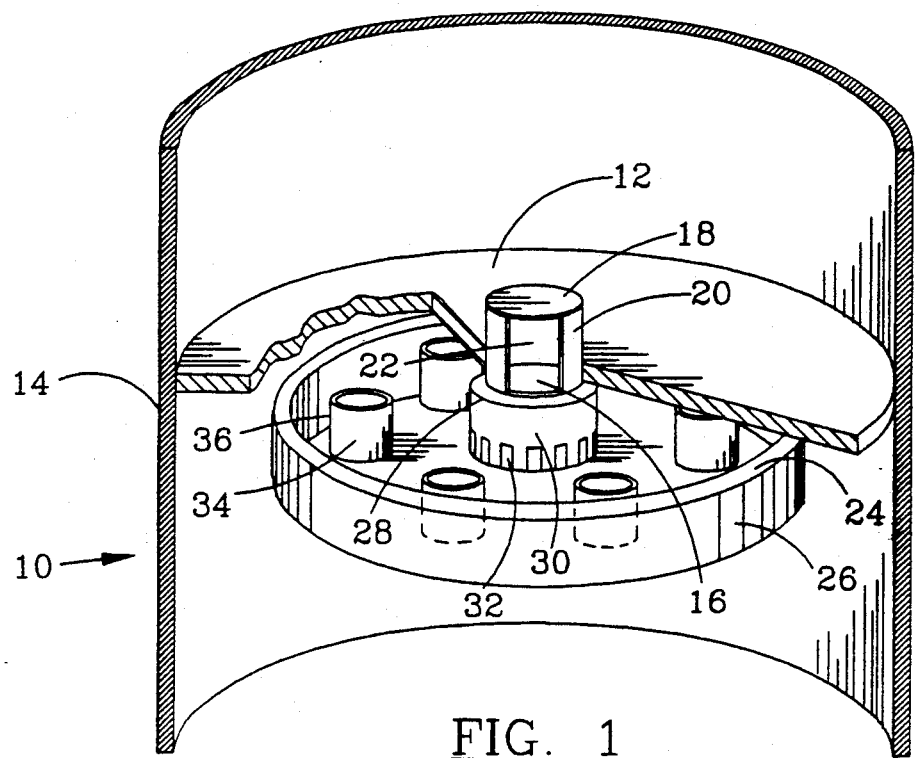
FIG. 1 is a partially cut away perspective view of an embodiment of the mixing apparatus of the present invention installed in a vertical reactor vessel.
Figure 2:
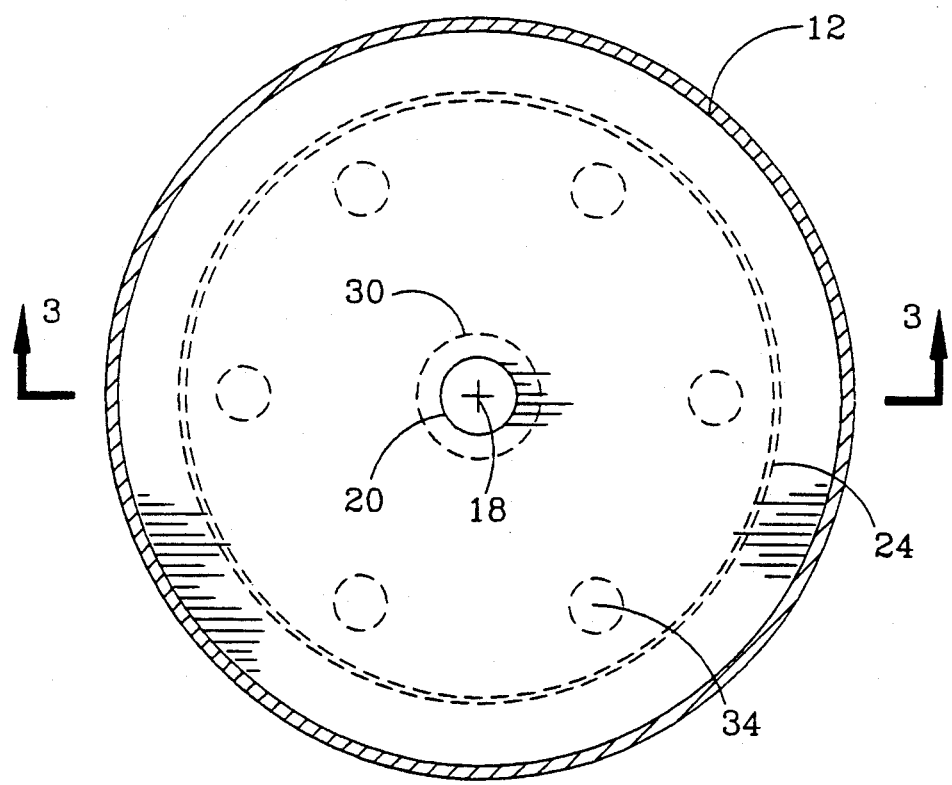
FIG. 2 is a plan of the mixing apparatus of FIG. 1.
Figure 3:
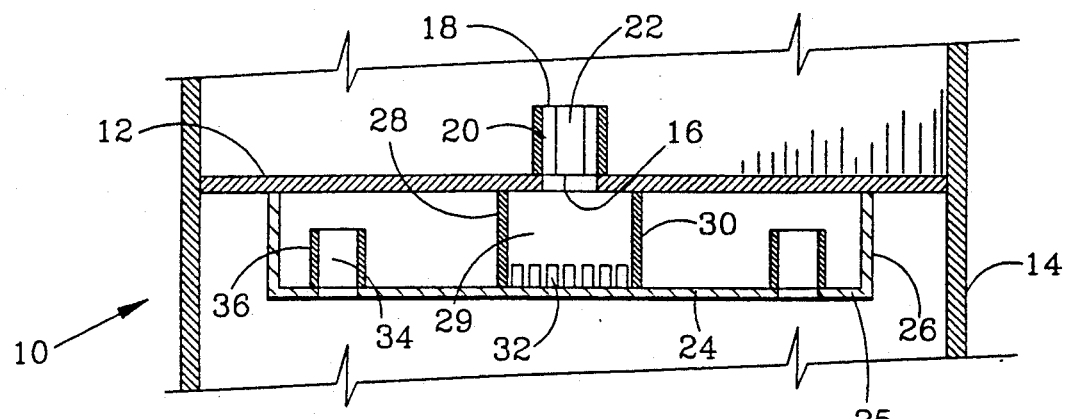
FIG. 3 is a cross-sectional view of the mixing apparatus of FIG. 2 taken along the lines 3—3, wherein notches adjacent the pan are rectangular.
Figure 4:
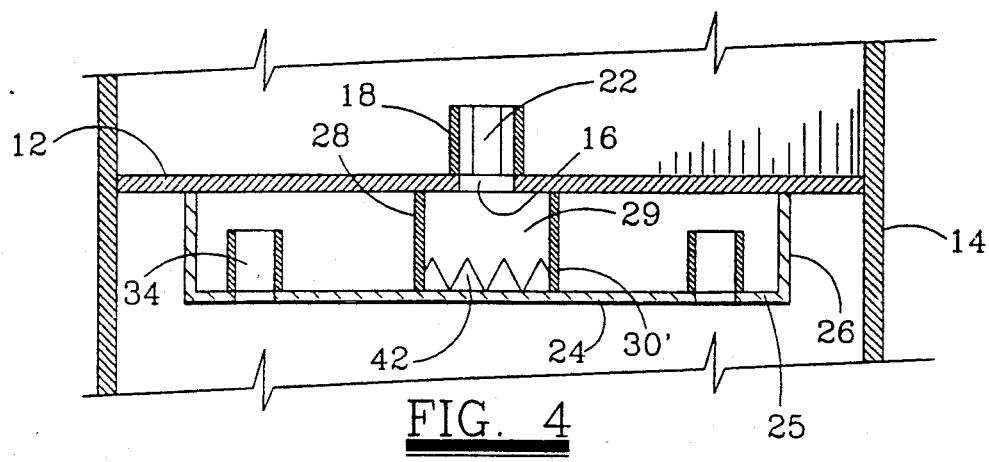
FIG. 4 shows an alternative embodiment of the mixing apparatus of FIG. 3, wherein notches adjacent the pan are triangular.

The present invention is based on a design of an apparatus for intimately mixing concurrently, downwardly flowing fluids to enhance mixing. When used in a quench zone between successive catalyst beds of a multi-bed reactor, the mixer reduces temperature variance of the intermediate reactant stream and improves temperature control of the downstream bed. In addition, the mixer is space efficient, requiring little vertical length within the reactor vessel, and requires a relatively low pressure drop.

Referring to FIGS. 1-5, a fluid-solid contacting vessel 100 including an inlet pipe 102 and an outlet pipe 104 has a mixer 10 according to the present invention installed in an intermediate region between an upper contact bed 106 and a lower contact bed 108. The mixing apparatus 10 is generally suitable for use in any concurrent, downwardly flowing, fluid-solid contacting process. The illustrated mixer is particularly adapted for use in multi-phase, exothermic, hydrogenation processes exemplified by catalytic hydrogenation reactions such as hydrodesulfurization, hydrocracking, and the like. For clarity and convenience, reference is made herein primarily to a preferred hydrocarbon treatment application of the mixer 10. Such utility, however, should not be construed as a limitation of the present mixer.

The vessel 100 also has a pipe or conduit 110 for inlet of a quench stream which in the preferred catalytic process is generally hydrogen or a hydrogen-rich gas. The quench inlet 110 has a pipe 112 attached for sparging the quench gas into a quench zone in the vessel 100. As is conventional in the art, the pipe preferably has a centrally placed slot (not shown) downwardly oriented to distribute the cold hydrogen gas from the side wall to the center of the vessel 100.

The multi-phase fluid mixer 10 comprises a tray 12 horizontally disposed across the cross-section of the vessel 100 and preferably removably attached to the vessel wall 14. Conventional means (not shown) such as angle iron, channels, brackets, and the like are used to support the tray 12, preferably at the vessel wall 14, and a conventional sealing means such as a gasket (not shown) can be used at the vessel wall 14. The tray 12 preferably has a centrally disposed aperture 16 which is more preferably concentric.

A cap 18 covers the aperture from the upstream side of the tray 12. The cap 18 is preferably cylindrical and has a side wall 20 securely affixed at a lower end to an upper surface of the tray 12. Two or more openings 22 formed in the wall 20 of the cap 18 permit communication of fluids through the aperture 16 in the tray 12 from the upstream region of the vessel 100. Preferably, a pair of diametrically opposed openings 22 have the same dimensions and extend the length of the wall 20 so that the flowing streams will collide and good mixing will result therefrom. As a rule of thumb, each opening 22 preferably extends about 10-20% of the circumference of the cap 18.

The cap 18 and openings 22 are preferably specified dimensionally to yield a two phase flow velocity through the openings 22 of about 10-15 m/s (33-49 ft/sec) or less. This velocity is thought to be optimal for hydrotreater design. The cap 18 is preferably bolted to the tray 12 to allow access to the central aperture 16. For most commercial applications, the aperture 16 is preferably sufficiently large to also serve as a manway and catalyst loading port.

A pan 24 is disposed on the downstream side of tray 12. The pan 24 is preferably cylindrical and includes a bottom member 25 and a side wall 26. The side wall 26 is sealingly secured along an upper end to a lower surface of the tray 12. The pan 24 is spaced a sufficient distance from the tray 12 to permit a suitable holdup for fluids passing through the aperture 16 and entering the pan 24.

The pan 24 should be deep enough to prevent flooding during upset conditions or times of high liquid flow rates but shallow enough to prevent liquid velocities from becoming too low in any space above the liquid holdup level. The pan 24 should have a relatively smaller diameter than the vessel 100 to avoid low fluid velocities which inhibit mixing, and to avoid thermal stresses on the vessel wall 14 which could result from a cold fluid impinging thereon. The overall diameter of the pan 24 is preferably from about 50 to about 70 percent the diameter of the vessel wall 14 so that the pan area is on the order of a third that of a transverse cross section of vessel wall 14. The pan 24 also preferably has drain holes (not shown) to permit liquid drainage during shutdown.

A tube 28 is disposed between the tray 12 and the pan 24. The tube 28 has an interior region 29 and a wall 30. The tube encloses the aperture 16 from the downstream side of the tray 12. An upper end of the tube wall 30 is sealingly secured to the lower surface of the tray 12 and a lower end of the tube wall 30 is sealingly secured to the bottom plate 25.

The tube wall 30 has a plurality of passages 32 formed therein which are radially spaced along the perimeter of the lower end. The passages 32 permit fluid communication between the interior 29 of the tube 28 and the pan 24 and inhibit liquid and gas component streams from channeling preferentially to one side or the other of the mixer 10. The passages as illustrated are rectangular notches 32 (FIG. 3) or triangular notches 42 (FIG. 4), however, other geometric shapes can be used depending on the various conditions of the mixing process. The passages 32 (FIG. 3) or 42 (FIG. 4) extend lengthwise along the tube wall 30 or 30' from adjacent the lower end to a distance which is less than the height of risers 34, and are sized to permit a two-phase velocity of about the same as the velocity through the cap openings 22.

The risers 34 have a cylindrical wall 36 and are radially spaced around the tube 28. A lower end of the riser wall 36 is sealingly secured to the pan 24 and an upper end of the wall 36 is spaced below the tray 12 but preferably above the passages 32 as mentioned previously. The risers 34 are open at both ends to define a conduit for fluid communication between the pan 24 and the downstream region of the vessel 100.

The risers 34 are preferably spaced on a circle that has a radius which is a quarter of the vessel diameter so that the risers 34 are centrally disposed. It has been found that a minimum riser height of about 5 cm (2 in.) above the height of the passages 32 is adequate in most designs to insure that the entering stream passes through liquid holdup on the pan 24. In such manner additional mixing occurs. The 5 cm height differential can be marginally increased as the pan diameter increases, subject to practitioner preference.

The number and dimensions of the risers 34 is preferably specified to yield a fluid velocity therethrough of about 4–8 m/s (13–26 ft/s). For example, in a typical hydrotreater vessel having a diameter of 3.7 m (12 ft), six risers with a 20 cm (8 in.) inside diameter can be suitably spaced 60° apart on a radius of 0.9 m (3 ft).

Figure 5:
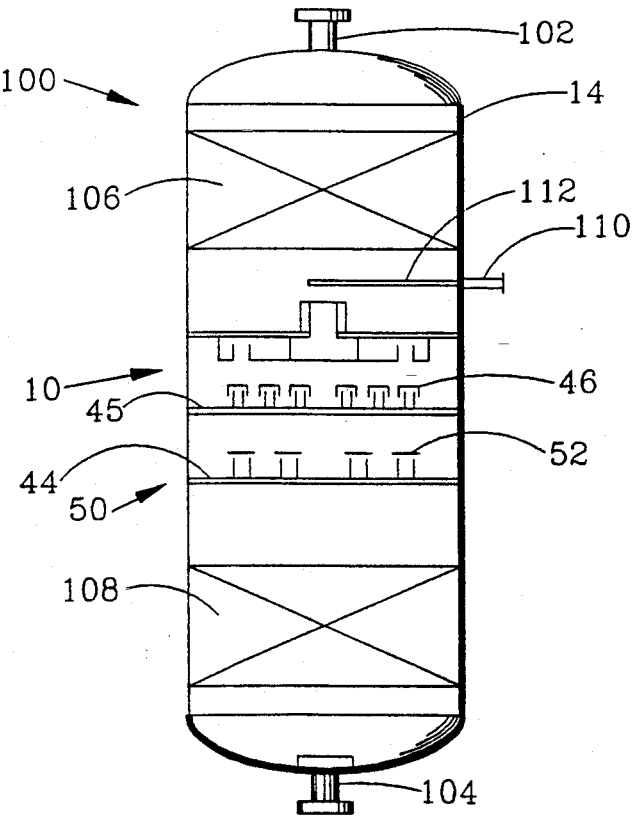
FIG. 5 schematically shows the mixing apparatus of FIG. 1 installed between catalyst beds in a vertical, split-bed reactor vessel.

The mixing apparatus 10 of the present invention is preferably used in a catalytic reactor in the intermediate region (i.e. quench zone) between catalyst beds 106, 108 as seen in FIG. 5. A mixed phase gas-liquid feed is introduced into the upper portion of the reactor vessel through inlet pipe 102. The inlet pipe 102 typically includes a sparging means and a distribution tray (not shown) to distribute the feed mixture over the first catalyst bed 106. After passing through the upstream catalyst bed 106, the hot multiphase hydrocarbon effluent fluid is combined with a hydrogen quench gas entering through the sparger pipe 110 to lower the temperature of the combined effluent stream before further treatment. The combined mixed phase effluent cascades down the vessel 100, passes through the mixer 10 and is intimately mixed therein. Turbulence and the tortuous mixing path in the mixer 10 provides intimate contact between the gaseous phase and the liquid phase. The mixed effluent stream then passes through the lower catalyst bed 108 and exits the reactor 100 at the outlet pipe 104.

In the mixing apparatus 10, the combined quench gas and multiphase fluid streams enter as a mixture through the opposed openings 22 in the cap 18, pass through the aperture 16 and the tube 28, exit from the tube 28 radially through the passages 32 or 42 onto the pan 24, and are discharged downstream through the risers 34. The mixture encounters a flow path which involves the bulk mixture in multiple separations at the openings 22, passages 32 or 42 and risers 34, and recombinations in the aperture 16 and tube 28, on the pan 24, and downstream from the risers 34. In addition, there is fluid holdup on the pan 24 corresponding to the height of the risers 34, and the fluid discharged from the passages 32 at a lower end of the tube 28 must pass through the reservoir of fluid on the pan 24, creating further turbulence and facilitating the formation of relatively small bubbles of the gaseous phase dispersed in the liquid phase, thereby providing intimate gas-liquid contact needed for effective heat and/or mass transfer between phases.

In the practice of the present invention, one or more conventional distributor trays downstream from the mixer 10 can be used to facilitate distribution of the stream over the cross-section of the lower catalyst bed 110. FIG. 5 shows a first distributor tray 45 having a plurality of bubble cap assemblies 46 thereon and a second distributor tray 50 having a perforated deck 44 with vapor chimneys 52.

A two-bed reactor is illustrated in FIG. 5. However, additional quench zones comprising the mixer 10 can be used following successive catalyst beds, particularly if three or more catalyst zones are used in the reactor vessel 100. In addition, two or more mixers 10 can be serially arranged in a single quench zone, if desired.

Use of the present mixer 10 reduces temperature variance and improves quenching action in the downstream effluent stream which in turn permits enhanced temperature control of the downstream bed 108.

The present invention is further illustrated by the following examples:

EXAMPLE 1

In a commercial scale hydrotreater, the dimensions of the components of the present mixer are specified as follows. Design parameters and specifications are listed in Table 1:

TABLE 1

| Design Parameter | Specification |
|---|---|
| Vessel diameter ($D_v$) | 3.7 m (12 ft) |
| Volumetric flowrate (Q) | 1.11 m$^3$/s (39.1 ft$^3$/s) |
| Velocity through the cap ($V_1$) | $\leq$12 m/s (40 ft/s) |
| Openings in cap | 15% of cap side wall (each slot) |
| Velocity through the aperture | 12 m/s (40 ft/s) |
| Velocity through notches | 12 m/s (40 ft/s) |
| Minimum width between notches | 2.5 cm (1 in.) |
| Riser placement radius | $D_v/4$ |
| Velocity through risers ($V_2$) | $\leq$6.1 m/s ($\leq$20 ft/s) |
| Minimum height differential between risers and notches | 5 cm (2 in.) |
| Pan diameter | 0.6 $D_v$ |
| Depth of pan | Highest feasible velocity for a situation of abnormally high liquid flow rate |

Given the above specifications, the diameter of the cap 18 is calculated as follows:

$$A_c = Q/V_1 = 1.11/12 = 0.0925 \text{ m}^2 \text{ (0.978 ft}^2\text{)}$$

$$D_c = (4A_c/\pi)^{0.5} = 34 \text{ cm (13.4 in.)}$$

wherein $A_c$ and $D_c$ are area and diameter of the cap, respectively. For design purposes $D_c$ is set at 36 cm (14 in.).

Width ($W_o$) of each opening 22 is $0.15\pi D_c = 17.0$ cm (6.60 in.). For design purposes $W_o$ is set at 18 cm (7 in.). Height ($H_o$) of the opening 22 is $Q/2V_1W_o = 26$ cm (10.2 in.). For design purposes $H_o$ is set at 26 cm (10 in.).

Calculation of the velocity through the openings 22 based on the rounded figures gives $V_1 = Q/2H_oW_o = 11.9$ m/s (39 ft/s) which is less than 12 m/s (40 ft/s). Therefore, the diameter of the aperture 16 ($D_{ap}$) is 46 cm (18 in.).

If typical notch width ($W_n$) and spacing ($W_s$) are chosen, the number of notches 32 is $\pi D_{ap}/(W_n + W_s) = 19$ (after rounding to a whole number). Notch height ($H_n$) is calculated from minimum velocity as $Q/19V_1H_nW_n = 9.4$ cm (3.7 in.) which for design purposes is set at 10 cm (3.75 in.).

Riser 34 placement in the pan 24 is $D_v/4 = 0.9$ m (3 ft) radius. Pan diameter ($D_p$) is $0.6D_v = 2.2$ m (7.2 ft) which for design purposes is set at 2.3 m (7.5 ft). To specify the number of risers 34, a reasonable riser diameter ($D_r$) is initially set at 20 cm (8 in.). Since the cross-sectional area of the riser discharge ($A_r$) is given by $Q/V_2$, the number of risers is $A_r/\pi D_r^2 = 5.6$. This number is rounded to 6. Since the riser height ($H_r$) is set at 5 cm (2 in.) greater than the notch height $H_n$, a reasonable $H_r$ is 15 cm (6 in.).

Calculation of the depth of the pan 24 is more arbitrary since the pan must have sufficient liquid holding capacity to avoid choking during a period of abnormally high liquid flow rate, yet maintain a reasonably high gas velocity through the space between the risers and the top of the pan 12 during normal operation. Since riser height ($H_r$) is 15 cm (6 in.), liquid height ($H_l$) can be estimated at between 2.5-5 cm (1-2 in.) above the riser, and the space above the liquid height (but below the tray) ($H_s$) should be between about 5-8 cm (2-3 in.) to maintain a reasonable gas velocity, this gives a choice for the pan depth of 22.5-28 cm (9-11 in.). Setting the pan depth at 25 cm (10 in.), for example, $H_l$ is calculated as:

$$(H_l = [14860 Q_l/D_r 9^{0.7}])$$

wherein $Q_l$ is the liquid volumetric flow rate in units of m³/s, $D_r$ is riser diameter in cm, and $H_l$ is liquid height in cm. For a 25 cm (10 in.) pan, $H_l$ is 3.3 cm (1.3 in.) and $H_s$ is 6.9 cm (2.7 in.). Gas velocity based on an $H_s$ of 6.9 cm (2.7 in.) is calculated to be 2.6 m/s (8.8 ft/s) which is considered acceptable. Therefore, a pan depth of 25 cm (10 in.) is chosen.

EXAMPLE 2

The mixer of the present invention was modeled in polymethylmethacrylate (PMMA) and mounted in a PMMA column to test two-phase mixing capabilities in the present mixer. In this example, gas phase mixing effectiveness was determined using a methane tracer gas. Methane was added to air and the combined gas stream was sparged into water passing down through the column. The degree of mixing was determined by taking gas samples from several locations downstream of the mixing tray. The samples were analyzed using gas chromatography.

The model column had a 0.86 m (34 in.) diameter, 2.5 cm (1 in.) wall thickness and 1.8 m (6 ft) length (not including the height due to the heads). The liquid (water) inlet was at the top of the upper head and included a distributor pipe. The inlet distributor was closed at the bottom and had rectangular notches along a bottom perimeter to radially distribute the incoming liquid. A first gas/liquid (g/l) distributor tray containing 7 downcomers in conventional arrangement was located at a distance 41 cm (16 in.) below the inlet distributor for hydrotreater simulation. The sparger was 15 cm (6 in.) below the first distributor tray. The sparger could be moved to input the gas either at the wall or along the axis. The mixer deck was 25 cm (10 in.) below the sparger, a second distributor tray was 37 cm (14 in.) below the mixing tray and a third gas/liquid distributor tray was 38 cm (15 in.) below the second distributor tray. The distance from the third tray to the bottom head was 41 cm (16 in.). The second distributor tray consisted of seven bubble caps conventionally placed and the third gas/liquid distributor tray was similar to the first.

Commercial scale hydrotreater design was applied to the column and the design parameters and calculations specified in Example 1 were used to build the mixer. Mixer design values are listed in Table 2. The unit is not truly a scale-down, but rather, a smaller version of a full scale reactor. While the dimensions of the mixer are proportionally reduced, the bubble cap and downcomer dimensions are full scale only reduced in number to maintain the same superficial velocities through each tray.

TABLE 2

| Parameter | Specification |
| --- | --- |
| Cap diameter | 8.6 cm (3.375 in.) |
| Cap opening dimensions | 3.8 cm wide × 7.6 cm high |
| Tray aperture diameter | 11.1 cm (4.375 in.) |
| Pan diameter | 56 cm ID (22 in. wide) |
| Pan depth | 7.0 cm (2.75 in.) |
| No. of notches | 18 |
| Notch dimensions | 1.3 cm wide × 2.5 cm high |
| No. of risers | 6 |
| Riser layout radius | 22.9 cm (9 in.) |
| Riser diameter | 4.8 cm (1.875 in.) |
| Riser length | 4.1 cm (1.625 in.) |
| Distance of riser from tray | 2.9 cm (1.125 in.) |

Ancillary equipment included a 780 liter (200 gallon) water holding tank, a suitable pump, and a gas/liquid separator. Instrumentation measured the temperature and pressure of all streams entering and leaving the unit, as well as pressure at each tray, so that pressure drop throughout the column could be determined. Gas flows were measured by rotameters and the water flowrate was measured using an in-line orifice plate. Sampling equipment was designed to allow gas samples to be taken in the region below the mixing tray and the two distributor trays downstream from the mixer. Gas sampling lines were horizontally positioned below each tray. Liquid sampling tubes were similarly mounted except that the sample probes were located above the tray decks in holdup liquid. The location of the sampling probes is indicated in Table 3.

TABLE 3

| SAMPLE POINTS | NUMBER OF PROBES | LOCATION |
| --- | --- | --- |
| A | 4 | After mixing tray (gas) |
| B | 2 | After bubble cap tray (gas) |

TABLE 3-continued

| SAMPLE POINTS | NUMBER OF PROBES | LOCATION |
|---|---|---|
| C | 2 | After final distribution tray (gas) |
| D | 4 | After mixing tray (liquid) |
| E | 2 | After bubble tray (liquid) |

Sixteen runs were made, varying the water and air flow rates independently. The operating range was between 0.076–0.223 m³/min (2.67–7.89 ft³/min) liquid rate and 1.654–4.964 m³/min (58.4–175.3 ft³/min) vapor rate for a mixed phase flow rate between 1.73–5.187 m³/min (61.1–183.2 ft³/min) which is equivalent to 40–120 percent of expected design flow rates in a typical commercial hydrotreater.

Data presented in Table 4 indicate that pressure drop across the vessel internals was dependent almost entirely on the pressure drop across the mixer tray. Pressure differential across the mixer increased linearly with both an increase in liquid and gas component flow rates. Also, pressure drop across the vessel ($\Delta P$) was more sensitive to gas flow rate. $\Delta P$ was found to be proportional to $Q_{water} + 1.5Q_{air}$ wherein Q is the percent design flowrate used.

TABLE 4

| Air Flow Rate (% design) | Liquid Flow Rate (% design) | $\Delta P$ at specified point (kPa (in. H₂O)) | |
|---|---|---|---|
| | | Mixer | 2nd Distributor Tray |
| 40 | 40 | 0.5 (2) | 0.5 (2.0) |
| 100 | 40 | 2.0 (8) | 0.5 (2.0) |
| 120 | 40 | 3.0 (12) | 0.5 (2.0) |
| 40 | 60 | 0.7 (2.8) | 0.6 (2.5) |
| 60 | 60 | 1.4 (5.5) | 0.6 (2.3) |
| 60 | 80 | 2.2 (9) | 0.6 (2.5) |
| 80 | 80 | 3.0 (12) | 0.6 (2.5) |
| 80 | 100 | 3.5 (14) | 0.7 (2.8) |
| 100 | 100 | 4.5 (18) | 0.7 (2.8) |
| 40 | 120 | 2.5 (10) | 0.7 (2.8) |
| 120 | 120 | 6.0 (24) | 0.75 (3.0) |
| 40 | 40 | 0.5 (2) | 0.5 (2) |
| 40 | 100 | 0.7 (2.8) | 0.6 (2.5) |
| 40 | 120 | 1.5 (10) | 0.7 (2.8) |
| 60 | 60 | 1.4 (5.5) | 0.6 (2.3) |
| 60 | 80 | 2.3 (9.2) | 0.6 (2.5) |
| 80 | 60 | 3.0 (12) | 0.6 (2.5) |
| 80 | 80 | 3.5 (14) | 0.7 (2.8) |
| 100 | 40 | 2.0 (8) | 0.5 (2) |
| 100 | 100 | 4.5 (18) | 0.7 (2.8) |
| 120 | 40 | 3.0 (12) | 0.5 (2) |
| 120 | 120 | 6.0 (24) | 0.7 (3) |

With regard to liquid level on top of the mixer as a function of water and air flow rate, maximum water level was 5.4 cm (2.125 in.) for 120% water flow and 40% air flow and minimum water level was 1.9 cm (0.75 in.) for 100+% air flow and 40% water flow.

Overall, no shortcomings were revealed in the hydraulic behavior of the experimental vessel during testing. Pressure drop and other flow characteristics were stable over the range from 40 to 120 percent of design flow rates.

Gas/gas mixing tests were conducted by continuously adding methane to the sparge air to make up 1.5 percent by weight of the gas. Generally three gas bag samples were taken at each of the 9 gas sampling points. Data is presented in Tables 5 and 6 in terms of the standard deviation of the mean methane concentration at each point. In addition tests were conducted with the sparger nozzle centered (which is standard practice) and at the wall.

TABLE 5

| | Run No. | | | | | |
|---|---|---|---|---|---|---|
| | 1 | 2 | 3 | 4 | 5 | 6 |
| Sparger Location | Center | Center | wall | Center | wall | Center |
| Design Flow rate (%) | 100 | 100 | 100 | 100 | 100 | 100 |
| Std. Deviation (%) (Sample Point A) | 1.47 | 3.70 | 6.85 | 2.72 | 7.22 | 3.07 |
| Std. Deviation (%) (Sample Point B) | 1.86 | 4.35 | 6.62 | 2.87 | 6.73 | 1.10 |
| Std. Deviation (%) (Sample Point C) | 2.19 | 3.75 | 4.52 | 5.80 | 5.26 | 2.22 |
| Mean | 1.84 | 3.94 | 6.00 | 3.80 | 6.40 | 2.13 |

TABLE 6

| | Run No. | |
|---|---|---|
| | 7 | 8 |
| Sparger Location | Center | wall |
| Design Flow rate (%) | 40 | 40 |
| Std. Deviation (%) (Sample Point A) | 2.50 | 4.19 |
| Std. Deviation (%) (Sample Point B) | 3.86 | 2.59 |
| Std. Deviation (%) (Sample Point C) | 3.51 | 3.42 |
| Mean | 3.29 | 3.40 |

Table 5 data revealed that the standard deviation roughly doubled when the sparge tube was moved to a position near the vessel wall and that the system was moderately sensitive to sparger location. However, even in this case significant mixing did occur as evidenced by mean percent deviations of only 6.00 (Example 3) and 6.40 (Example 5).

The data in Table 6 showed that the gas phase mixing effectiveness was not significantly affected by the decrease in operating rates and that gas phase mixing was accomplished effectively at turndown. In addition, this system was less sensitive to sparger location.

EXAMPLE 3

Gas/Liquid Mixing

Gas/liquid mixing tests (25 overall) were conducted using the same equipment described in Example 2. In this example, ammonia tracer gas was added to the air sparge gas. Ammonia absorption in the liquid phase was determined from liquid samples simultaneously taken at the above noted liquid sampling locations. The standard deviation of the ammonia concentration was calculated to reveal ammonia concentration uniformity from point to point across the mixing tray and the other downstream distribution trays. Also, one gas sample below each tray was collected to determine ammonia concentration in the gas phase at the location in question. A liquid phase absorption efficiency was calculated to judge the mixing effectiveness.

The data in Table 7 show the calculated absorption rate at the 40, 100 and 120 percent operation rates. Table 8 gives a statistical interpretation of the Table 7 data.

TABLE 7

| Sample Point | Run No. | | | | | | | | | |
|---|---|---|---|---|---|---|---|---|---|---|
| | 9 | 10 | 11 | 12 | 13 | 14 | 15 | 16 | 17* | 18 |
| Design Flow (%) | | | | | | | | | | |
| | 100 | 100 | 100 | 100 | 100 | 120 | 120 | 120 | 40 | 40 |
| Gas Phase Ammonia Concentration (at specified point ppmv) | | | | | | | | | | |
| A | 151 | 184 | 165 | 147 | 162 | 81 | 77 | 41 | 122 | 325 |
| B | 120 | — | 171 | 113 | 85 | 88 | 74 | 25 | 641 | 564 |
| C | — | 229 | 171 | 96 | 35 | 71 | 53 | 46 | — | — |
| Calculated Percent Absorption After Each Tray | | | | | | | | | | |
| A | 91.9 | 90.0 | 89.7 | 89.6 | 80.1$^a$ | 91.2 | 82.9 | 94.6 | 95.3 | 93.3 |
| B | 93.5 | — | 89.4 | 92.9 | 90.1 | 91.4 | 84.0 | 97.0 | 81.1 | 96.7 |
| C | — | 87.6 | 89.4 | 94.0 | 96.1 | 92.8 | 88.3 | 94.3 | — | — |
| Liquid Phase Ammonia Concentration (at specified point ppmw) | | | | | | | | | | |
| D | 209 | 281 | 267 | 270 | 353 | 165 | 273 | 247 | 93 | 82 |
| E | 207 | 283 | 251 | 256 | 367 | 157 | 216 | 256 | 86 | 61 |
| Percent Standard Deviation of Liquid Samples Under Each Tray | | | | | | | | | | |
| D | 3 | 0 | 4 | 5 | 10 | 6 | 19 | 4 | 2 | 4 |
| E | 3 | 0 | 3 | 1 | 8 | 3 | 1 | 16 | — | 7 |

*Gas sparger located at the wall.
$^a$Faulty data point excluded from calculated average.

TABLE 8

| Sample Location | Design Flow (%) | | |
|---|---|---|---|
| | 100 | 120 | 40 |
| Average Calculated Absorption After Each Tray | | | |
| A | 90.3 | 89.6 | 94.3 |
| B | 91.5 | 90.8 | 88.9 |
| C | 91.8 | 91.8 | — |
| Standard Deviation of Calculated Absorption Data | | | |
| A | 1.1 | 6.0 | 1.4 |
| B | 2.0 | 6.5 | 11.0 |
| C | 3.9 | 3.1 | — |

The data were substantially reproducible with the standard deviation ranging from 1.1% to 6.5% except for a single odd datapoint of 11% for the 40 percent design flow trial.

While these data have greater scatter than data in Example 2 tests, it still appears that ammonia absorption is not significantly affected by operation flow rates. Increased contact time can explain the greater absorption efficiency at lower operation rates. Absorption efficiency after the mixing tray (90.3%) increased only by a small amount after both the mixing tray and the second distribution tray (91.5%), indicating that about 98+% of the absorption occurred in the mixing tray.

Also shown in Table 7 are the percent standard deviations in the concentration of all the liquid samples taken at various locations under a given tray. In many tests (see runs 9, 10, 11, 17 and 18) the percent deviation was low, ranging from 0 to 4 percent. These are comparable to the Example 2 results for gas phase methane mixing and indicate that the water concentration is substantially uniform across the trays. In contrast, the last runs having high percent standard deviations (see runs 13, 15 and 16) suggest that an analytical problem developed late in the experiment.

COMPARATIVE EXAMPLE 1

In the following comparative example, additional gas/gas and gas/liquid mixing tests were conducted (5 total) using the same equipment described in Examples 2 and 3 except for the mixing tray. The present mixing tray was disassembled so that only the deck 12 with the central aperture 16 were left.

Data in Table 9 indicate that the gas/gas mixing worsened considerably (compare run 19 to runs 1, 2, 4 and 6).

TABLE 9

| | Run No. | | |
|---|---|---|---|
| | 19 | 20 | 21 |
| Sparger Location | Center | Wall | Wall |
| Design Flow rate (%) | 100 | 100 | 100 |
| Std. Deviation (%) (Sample Point A) | 24.26 | 11.83 | 9.29 |
| Std. Deviation (%) (Sample Point B) | 21.56 | 6.59 | 6.75 |
| Std. Deviation (%) (Sample Point C) | 4.41 | 0.37 | 3.06 |
| Mean | 16.74 | 6.26 | 6.37 |

From the data seen in Table 10, the gas/liquid mixing also appeared to decrease somewhat (compare run 22 to runs 9–13).

TABLE 10

| | Run No. | |
|---|---|---|
| | 22 | 23 |
| Sparger Location | Center | Wall |
| Design Flow (%) | 100 | 100 |
| Sample Point | Calculated Percent Absorption After Each Tray | |
| A | 73.5 | 84.7 |
| B | 85.1 | 88.1 |
| C | 77.5 | 88.4 |
| Percent Standard Deviation of Liquid Samples Under Each Tray | | |
| D | 5 | 4 |
| E | 4 | 3 |

As can be seen from the data in Tables 9–10, mixing represented by the percent standard deviation of the methane or ammonia concentration reading was improved when the sparger was placed at the wall. This was not unexpected since residence time was increased by wall placement.

COMPARATIVE EXAMPLE 2

In the following comparative example, additional gas/gas and gas/liquid mixing tests were conducted (4 total) using the same equipment described in Examples 2 and 3 except that the mixer was modified to increase pressure differential across the tray. To increase the pressure drop, a concentric disk-donut combination (not shown) was inserted across the cross-section of the tube 28 to constrict passage therethrough. The constrictor was placed so that fluid passing through the aperture 16 impinged the surface of the disk before moving through the hole in the donut. It was theorized that greater pressure drop would increase turbulence for more effective mixing.

Use of the constrictor device increased the pressure drop from 5 kPa (0.7 psi) to 19 kPa (2.7 psi).

Despite some scatter, the data presented in Table 11 indicated that the gas/gas mixing did not significantly improve.

TABLE 11

|  | Run No. | |
| --- | --- | --- |
|  | 24 | 25 |
| Design Flow rate (%) | 100 | 80 |
| Std. Deviation (%) (Sample Point A) | 4.25 | 2.01 |
| Std. Deviation (%) (Sample Point B) | 2.43 | 3.89 |
| Std. Deviation (%) (Sample Point C) | 7.63 | 3.55 |
| Mean | 4.77 | 3.15 |

The data presented in Table 12 indicated that the quality of gas/liquid mixing is not substantially improved either.

TABLE 12

|  | Run No. | |
| --- | --- | --- |
|  | 26 | 27 |
| Sparger Location | Center | Wall |
| Design Flow (%) | 100 | 80 |
| Sample Point | Calculated Percent Absorption After Each Tray | |
| A | 88.6 | 91.3 |
| B | 91.8 | 86.8 |
| C | 78.9 | — |
|  | Percent Standard Deviation of Liquid Samples Under Each Tray | |
| D | 3 | 3 |
| E | 2 | 0 |

The foregoing description of the mixer is illustrative and explanatory thereof. Various changes in the materials, apparatus, and particular parts employed will occur to those skilled in the art. It is intended that all such variations within the scope and spirit of the appended claims be embraced thereby.

What is claimed is:

1. An apparatus for mixing concurrently downwardly flowing fluids, comprising:
    a tray extending across a mixing chamber and having an aperture therethrough;
    a cap disposed on a top surface of the tray covering the aperture, the cap having a plurality of radially spaced openings in side walls thereof in communication with the aperture for receiving fluids to be mixed from an upstream portion of the mixing chamber;
    a pan spaced from the tray adjacent a downstream portion of the mixing chamber;
    a tube disposed between the tray and the pan having a wall enclosing the aperture;
    a plurality of radially spaced fluid passages through the wall of the tube adjacent the pan;
    a plurality of risers radially spaced from the tube and extending from the pan, the risers having upper ends above said passages and spaced from the tray for fluid communication from the passages through the pan to a downstream portion of the mixing chamber.

2. The apparatus of claim 1, wherein said mixing chamber comprises an intermediate region between an upper and lower catalyst bed.

3. The apparatus of claim 2, wherein said catalyst beds are supported in a vertical vessel.

4. The apparatus of claim 1, wherein said aperture is centrally disposed in said tray.

5. The apparatus of claim 1, wherein said aperture and said tray are concentric.

6. The apparatus of claim 1, wherein said cap comprises a pair of diametrically opposed openings.

7. The apparatus of claim 1, wherein said openings extend the length of said side wall.

8. The apparatus of claim 1, where said tube and said aperture are concentric.

9. The apparatus of claim 1, wherein said passages are rectangular.

10. The apparatus of claim 1, wherein said passages are triangular.

11. The apparatus of claim 1, wherein said risers are spaced at regular intervals around said tube.

12. The apparatus of claim 1, wherein the pan has a surface area of from about 0.25 to about 0.5 that of the tray.

13. A method for quenching a mixed phase stream with a gaseous quench stream, comprising the steps of:
    concurrently introducing the mixed phase stream and the gaseous quench stream into a mixing chamber upstream from a tray extending across the mixing chamber, wherein the tray has a cap disposed on a top surface of the tray covering an aperture therethrough;
    passing the mixed streams through radially spaced openings formed in side walls of the cap and through the aperture into a tube disposed between the tray and a pan spaced downstream from the tray;
    passing the mixed streams from the tube through passages formed through a wall of the tube adjacent the pan;
    maintaining a liquid level on the pan into which the mixed streams are discharged from the passages; and
    passing the fluid streams through risers on the pan into a downstream portion of the mixing chamber.

14. The method of claim 13, wherein said mixed phase stream comprises an effluent of a vertical fixed or trickle catalyst bed.

15. The method of claim 13, wherein said mixed phase stream comprises an effluent of an absorption column.

16. The method of claim 13, wherein said gaseous quench stream comprises a hydrogen-rich gas.

17. The method of claim 13, wherein the pan has a surface area from about 0.25 to about 0.5 that of the mixing chamber.

18. A method for contacting first and second fluids, comprising the steps of:
    concurrently introducing the fluids into a mixing chamber upstream from a tray extending across the mixing chamber, wherein the tray has a cap disposed on a top surface of the tray covering an aperture therethrough;

passing the combined fluids through radially spaced openings formed in side walls of the cap and through the aperture into a tube disposed between the tray and a pan spaced downstream from the tray;

passing the combined fluids from the tube through passages formed through a wall of the tube adjacent the pan; and passing the fluids from the passages through risers on the pan into a downstream portion of the mixing chamber.

19. The method of claim 18, wherein the first fluid is gas and the second fluid is liquid, and further comprising maintaining a liquid level on the pan into which the fluids are discharged from the passages.

20. The method of claim 19, wherein the first fluid contains one or more components soluble in the second fluid for gas absorption in the mixing chamber.

* * * * *